Figure 1:
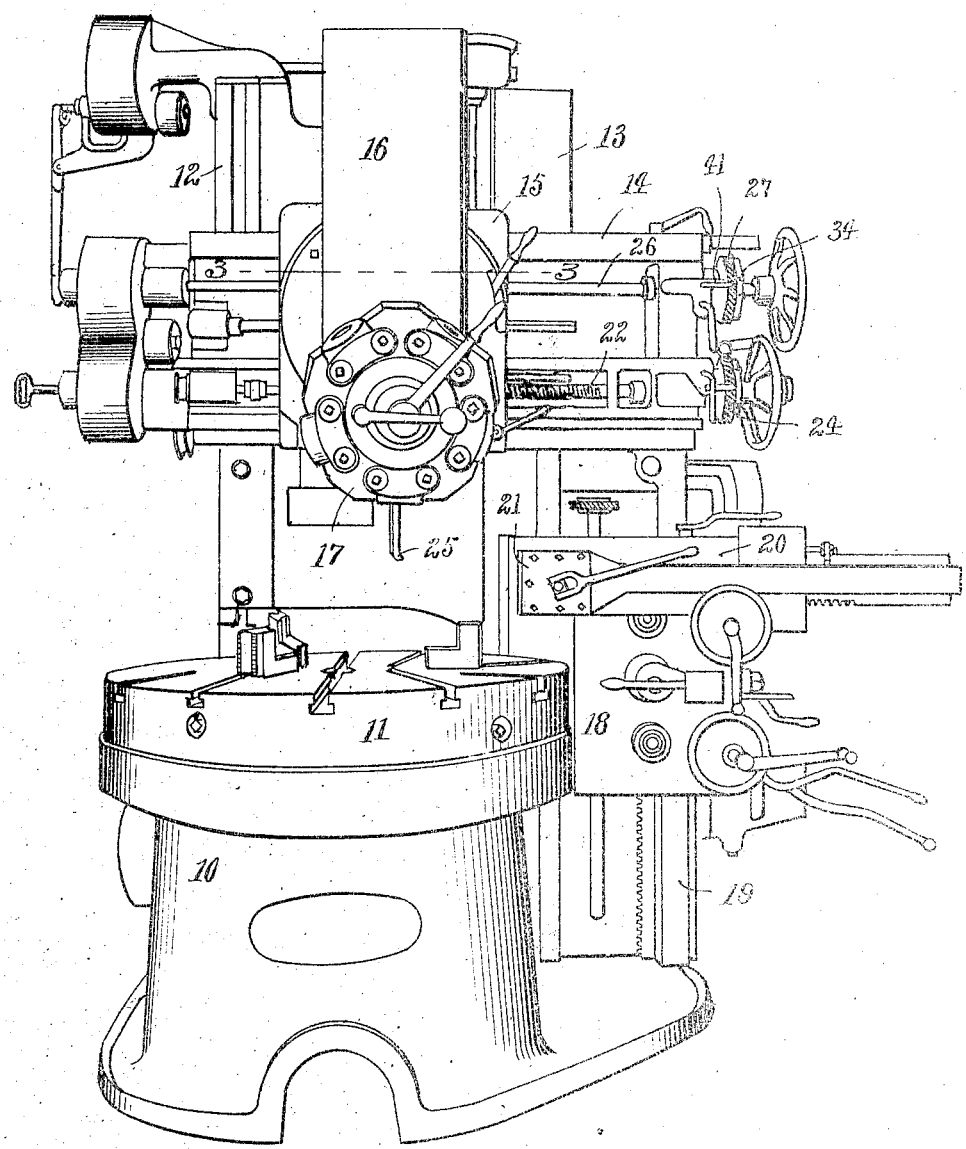

E. P. BULLARD, Jr.
ADJUSTABLE OBSERVATION STOP.
APPLICATION FILED JULY 17, 1912.

1,088,965.

Patented Mar. 3, 1914.

Witnesses

Inventor
Edward P. Bullard Jr
By Chamberlain & Newman
Attorneys

E. P. BULLARD, Jr.
ADJUSTABLE OBSERVATION STOP.
APPLICATION FILED JULY 17, 1912.
1,088,965.
Patented Mar. 3, 1914.
2 SHEETS—SHEET 2.
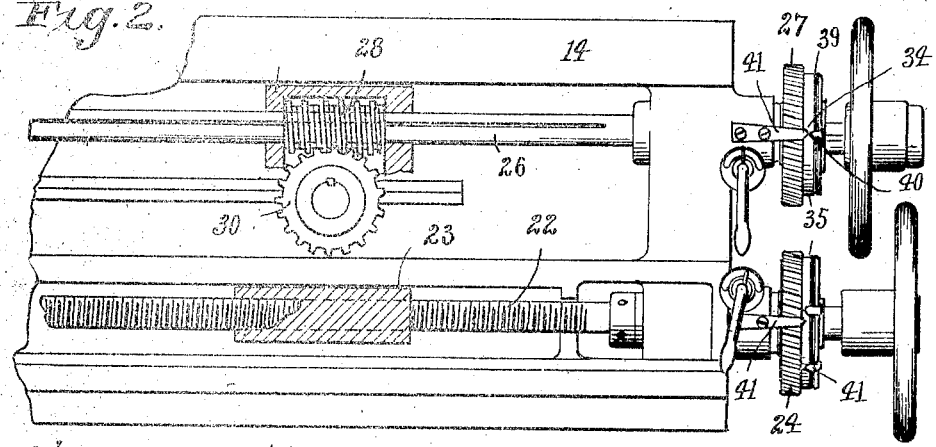
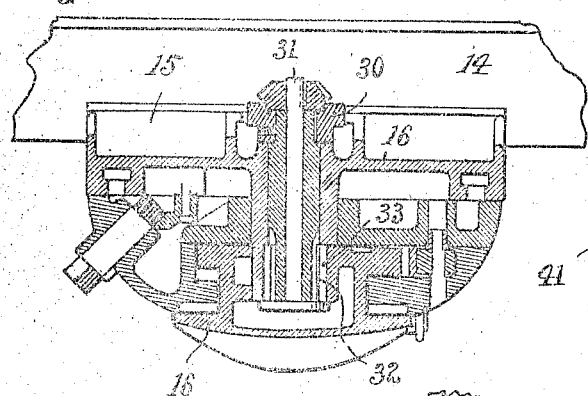
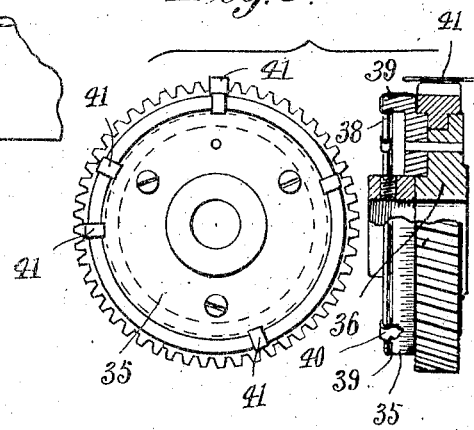
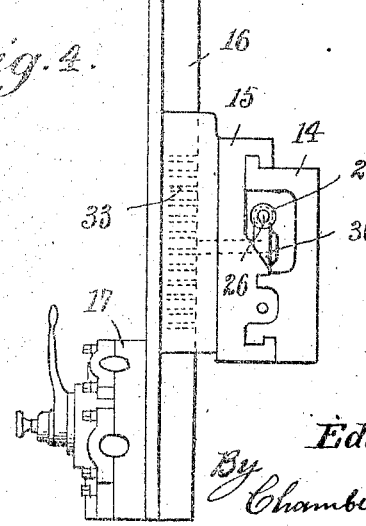
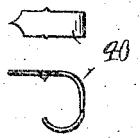
Witnesses
Ivan L. Morehouse
Ruth McOrden
Inventor
Edward P. Bullard Jr.
By Chamberlain & Newman
Attorneys

UNITED STATES PATENT OFFICE.

EDWARD P. BULLARD, JR., OF BRIDGEPORT, CONNECTICUT, ASSIGNOR TO THE BULLARD MACHINE TOOL CO., OF BRIDGEPORT, CONNECTICUT, A CORPORATION OF CONNECTICUT.

ADJUSTABLE OBSERVATION-STOP.

1,088,965.

Specification of Letters Patent.

Patented Mar. 3, 1914.

Application filed July 17, 1912. Serial No. 709,879.

*To all whom it may concern:*

Be it known that I, EDWARD P. BULLARD, Jr., a citizen of the United States, and resident of Bridgeport, in the county of Fairfield and State of Connecticut, have invented certain new and useful Improvements in Adjustable Observation-Stops, of which the following is a specification.

This invention relates to an improved form of adjustable observation stop, whereby the cutting tools of machine tools may be set for certain operations, with relation to the work carrying table.

The particular objects of the invention are to provide means for quickly and conveniently setting the point of the cutting tool at a given location for certain operations upon similar pieces of work; to provide means whereby both the vertical and horizontal position of the tool may be readily determined and set to begin work upon successive and similar pieces of work at a given point without the necessity of using gages or other instruments, and finally to provide means whereby the cutting tool may be differently set, for different cuts, for the various operations, upon similar pieces of work.

In the operation of boring mills, vertical turret lathes and like machine tools, it is usually the case that such machines will be working for a time, perhaps several days upon one particular part or piece of work, as for instance, pulleys, gear blanks or the like. Each annular cut upon this class of work is done by a gradual feeding of the tool vertically, horizontally, or perhaps both vertically and horizontally until the work is reduced to the proper dimension, and then a different, perhaps a finishing tool, is set for a second operation, which, like the first one, further reduces the casting to a given size, whereupon a third and fourth tool may also serve to determine the length and depth of some operations, as for instance the drilling of a hole, and whereby all the castings which are successively and separately turned or drilled, may be made exactly alike.

As before stated, the cutting tools, as shown in the drawings, are susceptible of being operated both vertically and horizontally which, through the automatic mechanism of the machine, are made to work in unison with each other so as to move the respective cutting tools angularly to produce an inclining or bevel cut and therefore, I provide two sets of observation stops which are connected with the mechanisms for the respective movements of the tools so that such movements when produced by each of the tools may not only be determined, but also whereby the angular movement produced by the two combined may in a like manner be determined. Any number of stopping points may be indicated for the said movements, as will later be explained, according to the number required for the various separate and distinct operations which the work upon the table may require.

Upon the accompanying drawings forming a part of this specification, similar characters of reference will be found to designate like or corresponding parts throughout the several figures and of which, Figure 1, shows a perspective view of an improved type of vertical turret lathe, such as is manufactured by me, and fitted with four sets of observation stops made in accordance with my invention. Fig. 2, is an enlarged detached front view of the right end portion of the cross rail and connected parts shown in Fig. 1. Fig. 3, is an enlarged cross sectional plan view of the saddle, slide and operative connections taken on line 3—3 of Fig. 1. Fig. 4, is a disconnected end view of the cross rail saddle, slide and turret head as seen from the right of Fig. 1. Fig. 5, shows upon an enlarged scale, both a side elevation and edge view, partly broken away, of one of the gears and connected graduated disk with adjustable observation stops mounted thereon, as is also shown in Figs. 1 and 2, and Fig. 6, shows a plan and side view respectively of one of the observation stops detached from the disk.

Referring in detail to the characters of reference marked upon the drawings 10 represents the frame of an improved type of metal turning machine and 11 the rotary table thereof.

12 and 13 indicate vertical guide ways of the frame and upon which a cross rail 14 is adjustably mounted and adapted to be vertically operated to raise and lower the saddle 15 mounted upon the rail. A slide 16 is adjustably mounted in the saddle and a turret head 17 is in turn mounted upon a stud of the slide in a way to be rotated thereon. A second saddle 18 is mounted in vertical ways 19 and is adapted to be raised and lowered so as to raise and lower the slide 20 and tool head 21 carried by the said saddle. This side head mechanism in a sense, is entirely separate from the turret head mechanism 17, and is designed to perform peripheral cuts upon the work carried by the table, while the upper or turret head provides for the drilling of holes, and the taking of inside annular cuts upon the work. Both of these tool heads are provided with mechanism for imparting thereto both vertical and horizontal movements which mechanisms while separate and distinct, yet may if desired, be set to work in harmony with each other so that the cutting tool can be made to travel in an angular direction with relation to the face of the rotary table. Each of these sets of horizontal and vertical feed mechanisms are separate and distinct and I therefore provide a separate set of observation stops for each set so as to determine the respective movements.

The mechanism for imparting to the saddle 15, slide 16 and turret head 17 a horizontal movement, includes a threaded feed shaft 22 that is journaled in the ends of the cross rail 14 and engages a threaded lug 23 on the said saddle 15 so that as the shaft is rotated the saddle will be moved backward or forward. Movement is imparted to the feed shaft 22 through a worm gear 24 that is operated by a worm driven by rear connections (not shown) with the main drive of the machine. The mechanism for imparting a vertical movement to the tool 25, tool head 17 and the slide 16 includes a shaft 26 driven by a worm gear 27 that carries a worm 28 splined to slide upon said shaft and engaged to be moved longitudinally thereon by a housing 29 connected with the saddle 15. This worm 28 meshes with and drives a worm gear 30 keyed to a short shaft 31 journaled in the said saddle. A pinion 32 is formed on the outer end portion of this shaft and is in engagement with a rack 33 formed in the vertically disposed head whereby the slide and its turret head are made to move vertically by the operation of the mechanism just described.

The separate sets of observation stops for each of the said mechanisms, for moving the head in the two directions are more or less alike in construction and therefore I will describe in detail but one set of such observation stops, viz., that applied to the mechanism for imparting to the tool the horizontal movements. The other set of observation stop mechanism 34 arranged on the adjoining upper shaft 26 is the same in construction and operation and serves as the indicating means for the vertical movement of the head and tool.

Referring more particularly to Figs. 2, 5 and 6, it will be noted that the observation stop mechanism consists in a disk 35 secured to the side of the hub 36 on which the before mentioned worm gear 27 is frictionally mounted. The hub and disk are thus made fast to turn the shaft while the gear may be forced to turn independently upon the hub. The disk includes an annular flanged portion having an inner and outer groove 38 and 39 formed therein for the attachment of the specially shaped adjustable sheet metal spring clips 40 as is clearly shown in Fig. 6. The peripheral surface of this disk is graduated to fractions of an inch, and the said clips 40 are set with reference thereto. There may be as many of these clips attached to the disk as there are different tools in the turret head so that each clip when set indicates the stopping point for that particular tool of the head. A fixed pointer 41 is secured to the rail and projects outward across the face of the gear 27 so as to properly register and aline with the adjustable clips 40 secured to the disk and thus obviously serve as the fixed point with which the adjustable stops 40 of the rotary disks are intended to register and be read. These stops of the disk are specially set for different kinds of work and would obviously be similarly set and used for similar cuts or operations upon like jobs. From the foregoing it will be seen that if one of the adjustable clips 20 be set at the zero point of the graduations on the periphery of the disk, it would mean that when said point was brought to register with the fixed finger 41, the saddle and tool would be operating in a certain plane with relation to the table. The advantage of this device is that the clips 40 can be more readily seen than the lines or numbers of the graduations and its location on the disk may be readily changed for the various and different kinds of work. Said clips are made to form an open loop with inturned portions to engage the groove of the disk so that they may be detachably connected, thus making it possible to use any desired number and likewise detach and remove from the disk any which are not needed to indicate a stopping point.

Having thus described my invention what I claim and desire to secure by Letters Patent is:—

1. The combination with a cross rail, a movable tool head mounted thereon and means for moving the same including a feed shaft, of a disk mounted upon the shaft and having an annular groove, a series of stops adjustably mounted in the groove of the disk, and a fixed pointer with which either of the said stops may be made to register.

2. The combination with a graduated disk of the class described and having annular grooves on opposite sides of its peripheral portion, of a sheet metal stop shaped to conform to the surface of the disk and provided with ends to yieldably engage the said grooves in a way to frictionally and detachably engage the peripheral portion of the said disk.

Signed at Bridgeport in the county of Fairfield and State of Connecticut, June A. D., 1912.

EDWARD P. BULLARD, Jr.

Witnesses:
MAY L. CLELAND,
G. N. MOREHOUSE.